Figure 1:
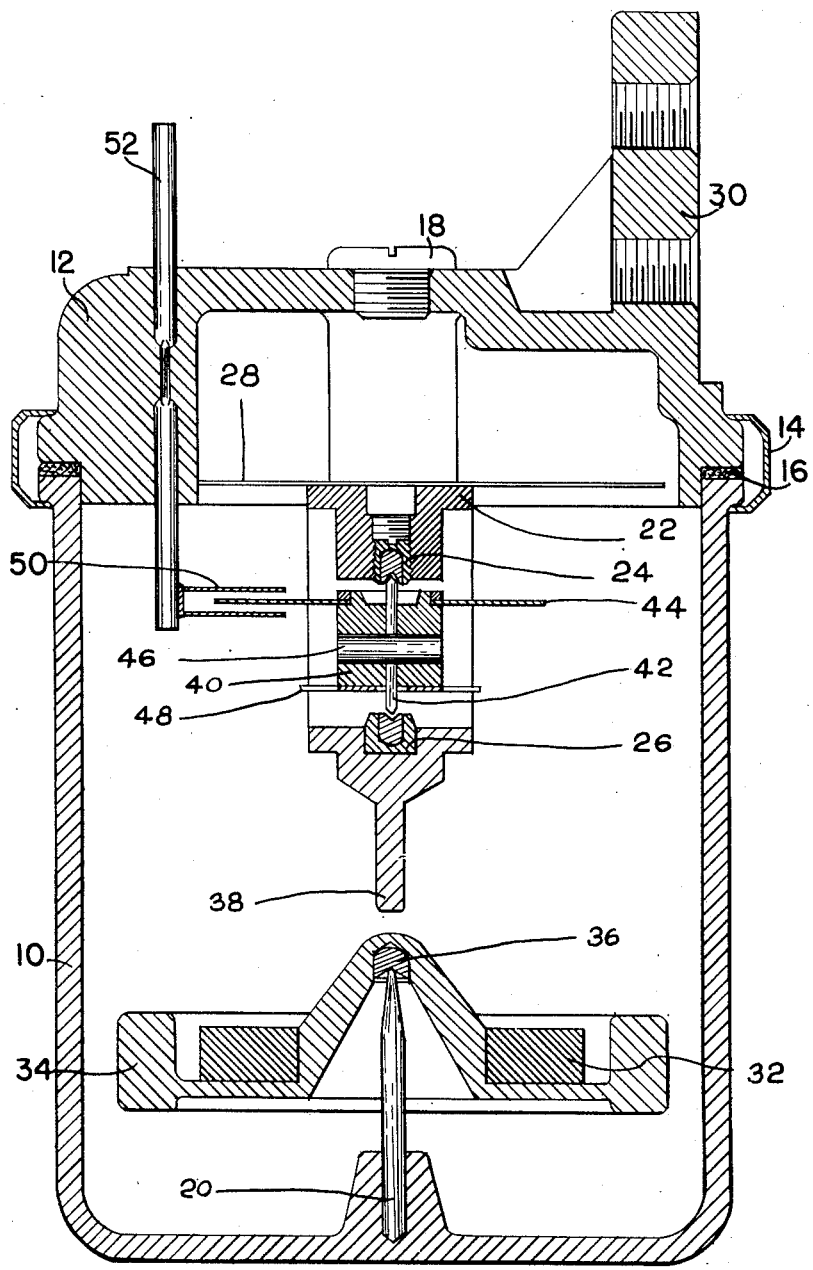

July 7, 1953 G. E. BREEZE ET AL 2,644,243
CONTROL COMPASS
Filed Nov. 20, 1944 2 Sheets-Sheet 1

Inventor
GEORGE E. BREEZE
RUSSELL I. MASON

By
Attorney

July 7, 1953　　　　G. E. BREEZE ET AL　　　　2,644,243
CONTROL COMPASS

Filed Nov. 20, 1944　　　　　　　　　　　　2 Sheets-Sheet 2

Inventors
GEORGE E. BREEZE
RUSSELL I. MASON

By　　　*F E Bush*
　　　　　Attorney

Patented July 7, 1953

2,644,243

UNITED STATES PATENT OFFICE 2,644,243

CONTROL COMPASS

George E. Breeze and Russell I. Mason, Waterford, Conn., assignors to the United States of America as represented by the Secretary of the Navy Application November 20, 1944, Serial No. 564,256

2 Claims. (Cl. 33—223)

The present invention relates to an improved design of control compass generally of the type described in application No. 561,414, filed November 1, 1944, "Control Compasses," now abandoned, for use in the directional radio sonic buoy of application No. 526,758, filed March 16, 1944, "Remote Control or Measurement Indicating Means." The compasses described in No. 561,414, when tilted, gave erroneous indications because the compass element supported by two bearings tended to become a dip-needle and would swing away from the correct north-south direction. Compensation for this effect may be made, for a given geographical latitude, by adjusting the weight of the counterbalance on the rotor but this is unsatisfactory. In the present design the condenser plate is not carried on the compass element but on a separate small compass carried above it and responsive to its magnetic field rather than that of the earth. The latter can be called the compass-condenser element. The compass element is carried above its center of gravity on a single pivot and tends to remain level despite any tilting of the case, thus avoiding the dip-needle effect, while the action of this effect on the small follower compass-condenser element on double pivots is relatively so small compared to the pull of the compass magnet as to be negligible.

The control compass of the present application is suitable for, though not limited to, use in a radio sonic buoy. As described in application No. 526,758, such a buoy might comprise a watertight buoyant body which contains a modulated radio transmitter and supports a directional hydrophone from its lower end. The body is caused to rotate about a vertical axis in the water by a suitable means thus rotating the hydrophone. The frequency of the transmitted carrier is varied in relation to its angular position relative to a given meridian by means of a condenser, one plate of which revolves with the buoy while the other is maintained stationary by means of a magnetic compass. The output of the hydrophone is used to modulate the carrier wave of the transmitter, Thus, an audible signal is transmitted when the hydrophone is directed toward a source of sound and on a frequency which corresponds to the angular position of the hydrophone. However, the structure of the buoy forms no part of the present invention, and is not further described herein.

It is an object of this invention to provide a control compass that will give accurate bearings when tilted, such as would take place under the rolling and jarring conditions of choppy or rough water.

Another object of this invention is to provide a control compass in which the directing magnet is unaffected by the magnetic dip when the case is tilted, and the dip error of the follower magnet is reduced to a minimum.

Another object of this invention is to provide a control compass in which the directing mechanism has no mechanical connection to the control mechanism.

Another object is the provision of a device which will be economical to manufacture, reliable in operation and which possesses all of the qualities of ruggedness and dependability in service.

Figure 2:
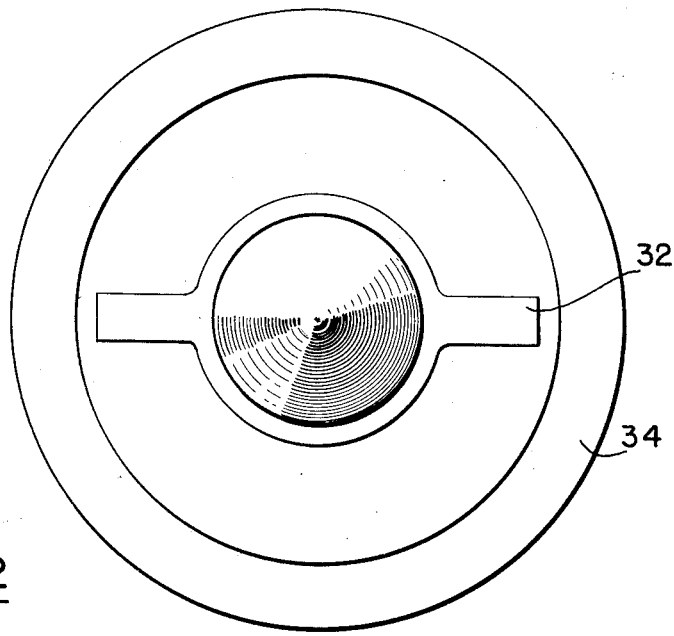
Figure 3:
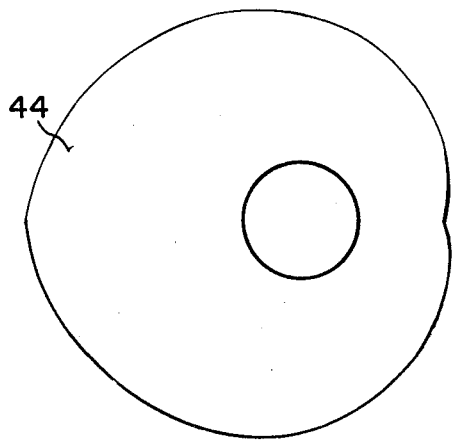
Figure 4:
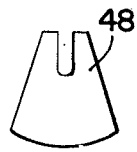

In the drawings:

Fig. 1 is a vertical axial section of the device;
Fig. 2 is a plan view of the compass element;
Fig. 3 is a detail of the condenser rotor; and
Fig. 4 is a detail of the counterweight.

The working parts of the device are enclosed by a case 10 and a cover 12 held together by a clamp 14 and sealed by a gasket 16. A plug 18 in the cover permits filling the case with compass fluid. A spindle 20 affixed vertically in the bottom of the case 10 supports the main compass element, and a yoke 22 carried on the cover 12 supports the follower compass-condenser element on bearings 24 and 26. A splash plate 28 is held in place between the yoke and the cover. A lug 30 on the cover 12 affords a means of support for the device.

The compass element consists of a magnet 32 supported by a plastic carrier 34 containing a bearing 36 which rests on the spindle 20. A stud 38 on the yoke 22 serves, when the instrument is assembled, to keep the compass element on the spindle.

The follower compass-condenser element consists of a hub 40 supported in the yoke bearings 24 and 26 by spindles 42. It carries a condenser rotor 44, a follower magnet 46 and a counterweight 48. The outline of the condenser rotor is generally that of a heart-shaped cam having a constant increase of radius with angle from a minimum radius to a maximum diametrically opposite radius, and repeats this variation on either side of the maximum radius.

A U-shaped condenser stator 50 formed of a narrow strip of metal is so supported by a terminal post 52 in the cover 12 that its arms are on opposite sides of the rotor 44 and are directed toward its axis of rotation.

In operation the compass element is held in one position relative to the surface of the earth by the action of the earth's magnetic field on the magnet 32. The follower magnet 46 aligns itself with the field of the compass magnet 32 and thereby maintains the condenser rotor 44 fixed in bearing as the buoy rotates.

As the buoy rotates, the amount of overlap of the condenser rotor 44 and stator 50 varies with the change of bearing of its hydrophone. The amount of this overlap controls the capacity between the stator 50 and surrounding metallic parts of the buoy through the rotor 44.

The condenser rotor 44 may be installed in any desired position with respect to the follower magnet 46; unlike the compasses described in the report hereinbefore mentioned, the present device as built has the rotor so arranged that with all elements at rest the condenser capacity is greatest when the stator is directly west of the pivot. As the device is installed in the buoy, a line from the pivot through the stator is in essentially the same direction as the axis of maximum sensitivity of the hydrophone. Thus when the hydrophone is so directed that it is most sensitive to sounds arriving from the west, the capacity of the condenser is greatest disregarding "fluid drag" on the rotor. This change of direction of maximum capacity has been made to accommodate an improvement in the indicating means in the receiving set.

In operation, the compass magnet 32 aligns itself with the earth's magnetic field, carrying supporting frame 34 mounted upon pivot 36 with it. The frame 34 may or may not be calibrated. If calibrated the bearing may be directly read therefrom for adjustment purposes. The control magnet 46 is mounted on frame 40 with the condenser rotor 44 and the frame is pivoted in bearings 24 and 26. The field of the compass magnet 32 is so strong inside the casing 10 that the small control magnet 46 aligns itself therewith at all times moving rotor 44 between plates 50 of the condenser corresponding to the position of the compass magnet 32. The drag of the control magnet 46 on the compass magnet 32 does not introduce errors in the compass magnet because the counter torque is magnetic instead of frictional. Furthermore, compass magnet 32 can be tilted in any position by rough water or the like and the control magnet 46 still faithfully follows the magnetic field without introducing additional frictional torque. Since rotor 44 is always aligned with the compass magnet the capacity of the condenser is proportional to the azimuth of the casing.

The present compass design may find use in the directional buoy of application No. 526,758, filed March 16, 1944.

What is claimed is:

1. A sonic buoy comprising in combination a non-magnetic casing having an opening, a casing cover having an integral supporting lug thereon, clamp means for securing said casing cover to the opening of said casing, a vertical spindle secured to the bottom of said casing, a main compass magnet element pivotally supported by said vertical spindle, means for preventing said compass magnet element from movement off said vertical spindle, said means comprising a yoke supporting means integral with said casing cover and projecting within said casing to a point above said spindle, said yoke supporting means having facing vertically spaced bearings secured thereon, a follower compass element having oppositely facing vertical supporting spindles rotatably mounted in said facing vertically spaced bearings, said follower compass element comprising a hub portion, a follower magnet and a horizontal condenser rotor fixed to said hub portion, said horizontal condenser rotor being heart-shaped and having mirror symmetry relative to a plane containing the rotor axis and the point of maximum radius, a condenser stator comprising two vertically spaced horizontal arms electrically cooperating with said horizontal condenser rotor, and a vertical terminal post secured to said casing cover and fixedly supporting said condenser stator.

2. The invention as defined in claim 1 but further characterized by said casing having compass fluid therein, said casing cover having a removable plug to permit filling said casing with said compass fluid, and a splash plate secured to said yoke supporting means to prevent excessive movement of said compass fluid.

GEORGE E. BREEZE.
RUSSELL I. MASON.

References Cited in the file of this patent
UNITED STATES PATENTS

| Number | Name | Date |
|---|---|---|
| 1,639,000 | Horton | Aug. 16, 1927 |
| 2,036,833 | Schmidt | Apr. 7, 1936 |
| 2,116,103 | De Beeson | May 3, 1938 |
| 2,277,027 | West, Jr. | Mar. 24, 1942 |
| 2,319,212 | Cooley | May 18, 1943 |
| 2,346,839 | Lear | Apr. 18, 1944 |
| 2,363,500 | Carter | Nov. 28, 1944 |